United States Patent
Hrusecky

(10) Patent No.: US 6,442,206 B1
(45) Date of Patent: Aug. 27, 2002

(54) ANTI-FLICKER LOGIC FOR MPEG VIDEO DECODER WITH INTEGRATED SCALING AND DISPLAY FUNCTIONS

(75) Inventor: David A. Hrusecky, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,600

(22) Filed: Jan. 25, 1999

(51) Int. Cl.[7] ................................................ H04B 1/66
(52) U.S. Cl. .................................. 375/240.21; 348/446
(58) Field of Search ........................... 348/405.1, 440.1, 348/441, 443.1, 444, 445–447, 439.1, 448, 449, 450, 910, 480, 433; 375/240.21, 240.27, 240.29, 240.01; 379/100.17

(56) References Cited

U.S. PATENT DOCUMENTS

| | | | |
|---|---|---|---|
| 5,034,814 A | * 7/1991 | Watson | 375/240.01 |
| 5,055,916 A | * 10/1991 | Dieterich | 348/433 |
| 5,481,297 A | 1/1996 | Cash et al. | 348/13 |
| 5,532,744 A | 7/1996 | Akiwumi-Assani et al. | 348/390 |
| 5,557,538 A | 9/1996 | Retter et al. | 364/514 |
| 5,583,572 A | 12/1996 | Sumihiro | 348/396 |
| 5,598,222 A | 1/1997 | Lane | 348/568 |
| 5,598,483 A | 1/1997 | Purcell et al. | 382/232 |
| 5,621,405 A | 4/1997 | Park | 341/67 |
| 5,623,311 A | 4/1997 | Phillips et al. | 348/396 |
| 5,623,314 A | 4/1997 | Retter et al. | 348/423 |
| 5,963,262 A | * 10/1999 | Ke et al. | 348/447 |
| 6,094,226 A | * 7/2000 | Ke et al. | 348/446 |

* cited by examiner

Primary Examiner—Chris Kelley
Assistant Examiner—Gims Philippe
(74) Attorney, Agent, or Firm—William H. Steinberg, Esq.; Kevin P. Radigan, Esq.; Heslin Rothenberg Farley & Mesiti P.C.

(57) ABSTRACT

A digital video decoder system, method and article of manufacture are provided having integrated scaling capabilities for presentation of video in full size or a predetermined reduced size, while at the same time allowing for reduced external memory requirements for frame buffer storage. The integrated system utilizes an existing decimation unit to scale the decoded stream of video data when the system is in scaled video mode. Display mode switch logic oversees switching between normal video mode and scaled video mode, wherein the switching occurs without perceptual degradation of a display of the decoded stream of video data. Scaled decoded video frames are buffered in a frame buffer which is partitioned depending upon whether the digital video decoding system is in normal video mode or scaled video mode. In scaled video mode, the frame buffer accommodates both full size I and P frames, as well as scaled I, P & B frames. The full size I and P frames are used to support future decode operations, while the scaled I, P & B frames are retrieved for display. Anti-flicker logic is also included within the decode system for displaying scaled video in a flicker-free fashion.

29 Claims, 11 Drawing Sheets

| PICTURE TYPE | SM CURRENT POINTER | SM DISPLAY POINTER | SM FUTURE POINTER | SM TRANSITION POINTER |
|---|---|---|---|---|
| RESET | 0 | 2 | 4 | 6 |
| I | 6 | 4 | 6 | 2 |
| P | 2 | 6 | 2 | 4 |
| B | 4 | 4 | 2 | 6 |
| B | 6 | 6 | 2 | 4 |
| P | 4 | 2 | 4 | 6 |
| B | 6 | 6 | 4 | 2 |
| P | 2 | 4 | 2 | 6 |
| P | 6 | 2 | 6 | 4 |

*fig. 7B*

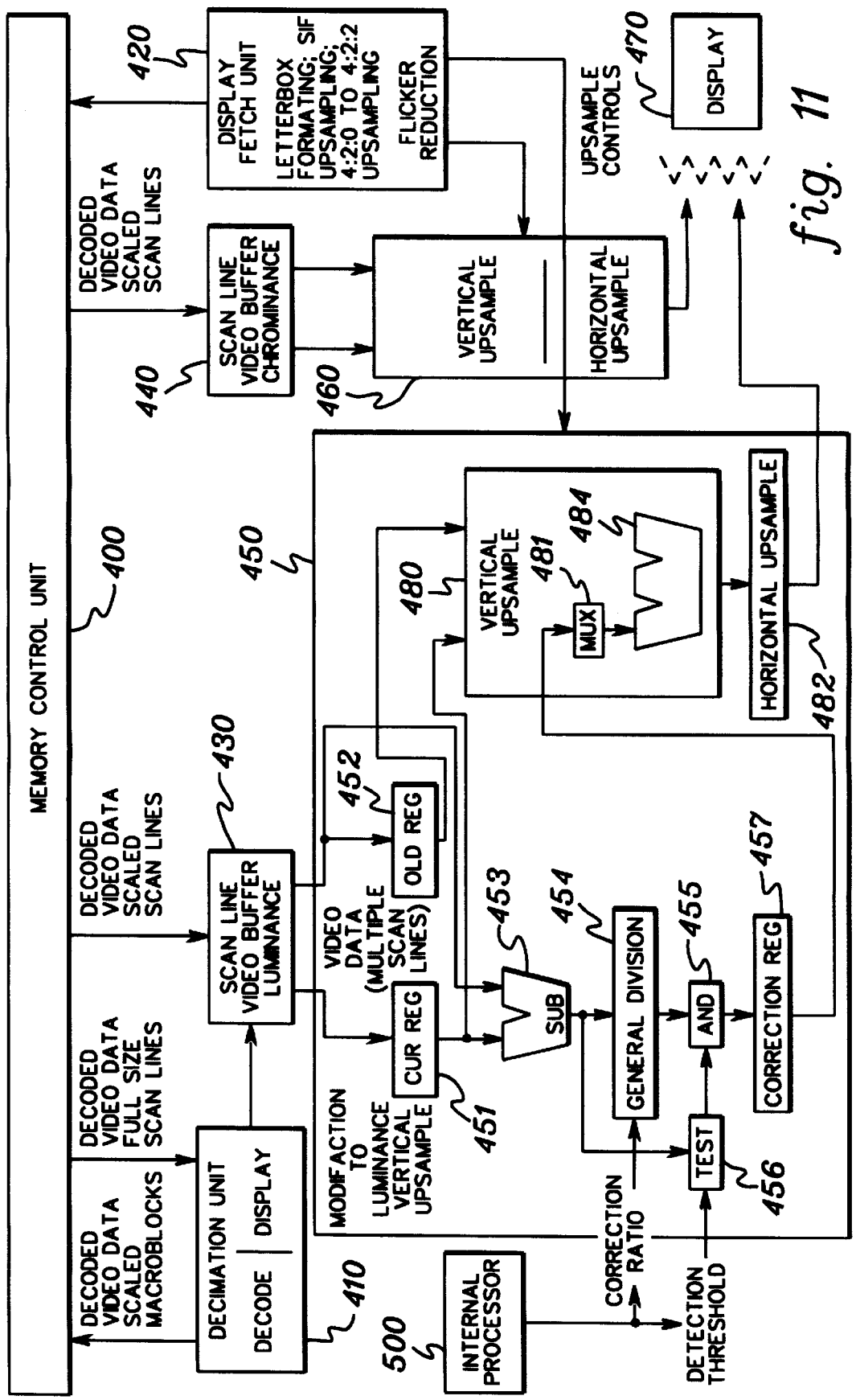

ANTI-FLICKER LOGIC FOR MPEG VIDEO DECODER WITH INTEGRATED SCALING AND DISPLAY FUNCTIONS

TECHNICAL FIELD

The present invention is directed generally to digital video signal processing, and more particularly, to integrated decode systems, methods and articles of manufacture which allow selective scaling of video presentation by a predetermined reduction factor, while at the same time allowing for reduced external memory requirements for frame buffer storage. The disclosed MPEG decoder also includes logic for displaying scaled video in a flicker-free fashion.

BACKGROUND OF THE INVENTION

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. Video decoding in accordance with the MPEG-2 standard is described in detail in commonly assigned United States Letters Patent No. 5,576,765, entitled "Video Decoder", which is hereby incorporated herein by reference in its entirety.

Video decoders are typically embodied as general or special purpose processors and memory. For a conventional MPEG-2 decoder, two decoded reference frames are typically stored in memory at the same time. Thus, the cost of memory can often dominate the cost of the decode system. For example, an MPEG-2 video decoder might employ 2 MB or more of external memory, which generally comprises Dynamic Random Access Memory (DRAM). External memory is used for various data areas, or buffers such as frame buffers.

In practice, the MPEG-2 video decoder is typically limited to 2 MB of external memory in order to minimize cost of the end product. The decoder must perform all of its functions within this limitation. For example, of particular importance is enabling output for both the European market which utilizes the PAL standard of 576 video scan lines and the U.S. market which utilizes the NTSC standard of 480 video scan lines. Even if there is no 2 MB of external memory limitation, it is advantageous to perform the video decode and display in as small a memory space as possible in order to give the remaining memory to other built-in features, such as on-screen graphics.

The MPEG-2 decompressed video data buffers, also called frame buffers, consume the largest part of external DRAM, therefore they are the prime candidate for memory reduction/compression. The frame buffers contain final pixel display and MPEG-reference data, and hence the reduction technique must also retain high video fidelity.

As the MPEG video decoder market becomes more and more competitive, there is a need for high level of feature integration at the lowest possible cost to achieve success in the marketplace. One such feature that, in the past, would have required circuitry external to the video decoder function is video scaling. The kind of scaling desired is to reduce the size of the display picture by a factor, such as 2 or 4, in both the horizontal and vertical axis.

In view of the above, and in order to establish commercial advantage, a novel design is desired wherein a video scaling feature is built into the video decoder, such that advantageous use of existing decoder hardware can be applied to the processes required to produce a high quality scaled image. In one principal aspect, the present invention addresses this need.

DISCLOSURE OF THE INVENTION

Briefly summarized, this invention comprises in one aspect a video decoding system which includes a video decoder for decoding an encoded stream of video data and a decimation unit coupled to the video decoder. The video decoder produces a decoded stream of video data and the decimation unit is adapted to scale the decoded stream of video data for display. The system further includes anti-flicker logic for reducing flicker between adjacent pixels of a display of a frame of the decoded stream of video data. The flicker results from the decimation unit's scaling of the decoded stream of video data for display.

In another aspect, the invention comprises video display logic for a digital video decoding system. The video display logic includes upsample logic for placing a decoded stream of video data in interlaced format, and anti-flicker logic associated with the upsample logic for reducing flicker between adjacent pixels of a display of a frame of the decoded stream of video data. The flicker comprises visually perceptible frequency change between adjacent pixels of the display of the frame in interlaced format.

In yet another aspect, the invention comprises a method for processing an encoded stream of video data for display. The method includes: decoding the encoded stream of video data to produce a decoded stream of video data; scaling the decoded stream of video data to downsize the decoded stream of video data and provide a downsized decoded stream of video data for display; and reducing a flicker between adjacent pixels of a display of a frame of the downsized decoded stream of video data, wherein the flicker comprises visually perceptible frequency change between adjacent pixels resulting from the scaling of the decoded stream of video data for display.

In yet another aspect, a method for processing a decoded stream of video data for display is provided. This method includes: upsampling the decoded stream of video data to place the decoded stream of video data in interlaced format; and reducing flicker between adjacent pixels of a display of a frame of the decoded stream of video data, wherein the flicker comprises visually perceptible frequency change between adjacent pixels of the display of the frame in interlaced format.

In a further aspect, an article of manufacture is provided which includes a computer program product comprising computer usable medium having computer readable program code means therein for use in processing an encoded stream of video data for display. The computer readable program code means in the computer program product includes: computer readable program code means for causing a computer to effect decoding the encoded stream of video data to produce a decoded stream of video data; computer readable program code means for causing a computer to effect scaling the decoded stream of video data to downsize the decoded stream of video data and provide a downsized decoded stream of video data for display; and computer readable program code means for causing a computer to effect reducing flicker between adjacent pixels of a display of a frame of the downsized decoded stream of video data, wherein the flicker comprises visually perceptible frequency change between adjacent pixels resulting from the scaling of the decoded stream of video data for display.

In a still further aspect, an article of manufacture is provided which comprises a computer program product having a computer usable medium with computer readable program code means therein for use in processing a decoded stream of video data for display. The computer readable program code means in the computer program product includes: computer readable program code means for causing a computer to effect upsampling of the decoded stream of video data to place the decoded stream of video data in interlaced format; and computer readable program code means for causing a computer to effect reducing flicker between adjacent pixels of a display of a frame of the decoded stream of video data, wherein the flicker comprises visually perceptible frequency change between the adjacent pixels of the display of the frame in interlaced format.

To restate, disclosed herein is a digital video decode system, method and article of manufacture which present an integrated scaling capability. The decoder is arranged such that it reduces the overall bandwidth to external memory when in the scaling mode. For example, the display picture can be reduced by a factor of 2 and/or 4 in both the horizontal and vertical axis. Advantageously, the integrated scaling function for the video decode system presented herein uses existing decoder hardware to produce a high quality scaled image.

By performing decimation/scaling at decode time, the total memory bandwidth requirement is reduced, making more memory bandwidth available to other features, such as on-screen graphics. Thus, scaling implemented in accordance with this invention requires less external memory (i.e., frame buffer memory) than would be required by a post-processing approach, i.e., a display scaler would require four full size frame buffers. Further, in accordance with this invention, switching between non-scaling and scaling modes does not produce display artifacts. Scaling in accordance with this invention can also be employed with B frame memory reduction in full frame format, as well as with letterbox format.

The digital video decode system, method and article of manufacture presented herein further include anti-flicker logic for displaying video, particularly scaled video, in a flicker-free fashion. The anti-flicker logic is implemented without significant additional hardware by utilizing existing upsample hardware within the system's video display unit.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 7*b* illustrates one example of switching of the small frame buffers 2, 4 & 6 of FIG. 6 in accordance with the present invention;

FIG. 11 is a block diagram of one embodiment of a video display unit in accordance with the present invention wherein luminance vertical upsample logic is modified to include anti-flicker logic in accordance with the principles of the present invention.

BEST MODE FOR CARRYING OUT THE INVENTION

As the present invention may be applied in connection with an MPEG-2 decoder, in order to facilitate an understanding of the invention, some pertinent aspects of the MPEG-2 compression algorithm are first reviewed. It is to be noted, however, that the invention can also be applied to other video coding algorithms which share some of the features of the MPEG-2 algorithm.

To begin with, it will be understood that the compression of a data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information; allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or non-interlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
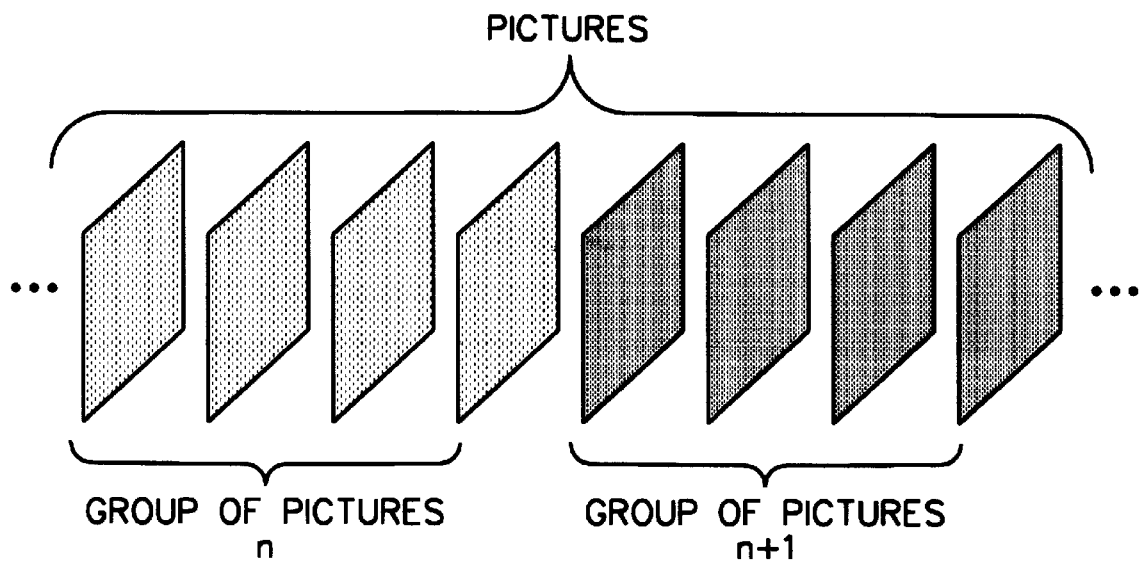
FIG. 1 shows an exemplary pair of groups of pictures (GOPs)
Figure 2:
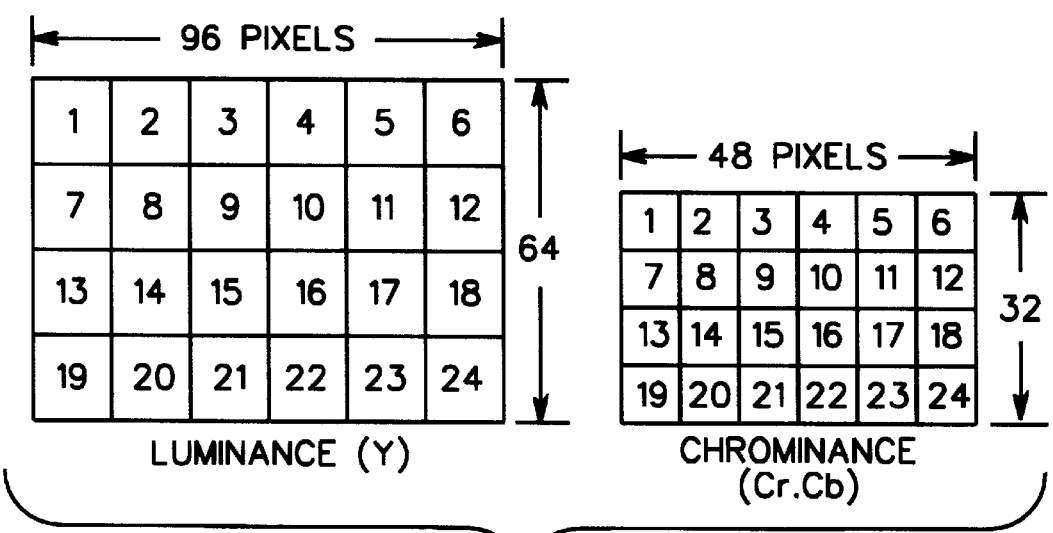
FIG. 2 shows an exemplary macroblock (MB) subdivision of a picture (4:2:0 format);.

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1 & 2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOPs. There is no limit to the number of pictures which may be in a GOP, nor do there have to be equal numbers of pictures in all GOPs.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field, and the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as I pictures, the first field can be coded as an I picture and the second field as a P picture, both fields can be coded as P pictures, or both fields can be coded as B pictures.

If a frame is coded as a frame-structured I picture, as two field-structured I pictures, or as a field-structured I picture followed by a field-structured P picture, we say that the frame is an I frame; it can be reconstructed without using picture data from previous frames. If a frame is coded as a frame-structured P picture or as two field-structured P pictures, we say that the frame is a P frame; it can be reconstructed from information in the current frame and the previously coded I or P frame. If a frame is coded as a frame-structured B picture or as two field-structured B pictures, we say that the frame is a B frame; it can be reconstructed from information in the current frame and the two previously coded I or P frames (i.e., the I or P frames that will appear before and after the B frame). We refer to I or P frames as reference frames.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-2 algorithm. Denoting the elements of the two-dimensional array of DCT coefficients by cmn, where m and n can range from 0 to 7, aside from truncation or rounding corrections, quantization is achieved by dividing each DCT coefficient cmn by wmn times QP, with wmn being a weighting factor and QP being the quantizer parameter. The weighting factor wmn allows coarser quantization to be applied to the less visually significant coefficients. The quantizer parameter QP is the primary means of trading off quality vs. bit-rate in MPEG-2. It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description is needed here.

Most video sequences exhibit a high degree of correlation between consecutive pictures. A useful method to remove this redundancy prior to coding a picture is "motion compensation". MPEG-2 provides tools for several methods of motion compensation.

The methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. If no motion compensation is used, the macroblock is intra (I). The encoder can make any macroblock intra. In a P or a B picture, forward (F) motion compensation can be used; in this case, the predictive macroblock is formed from data in the previous I or P frame. In a B picture, backward (B) motion compensation can also be used; in this case, the predictive macroblock is formed from data in the future I or P frame. In a B picture, forward/backward (FB) motion compensation can also be used; in this case, the predictive macroblock is formed from data in the previous I or P frame and the future I or P frame.

Because I and P pictures are used as references to reconstruct other pictures (B and P pictures) they are called reference pictures. Because two reference frames are needed to reconstruct B frames, MPEG-2 decoders typically store two decoded reference frames in memory.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control. strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 3:
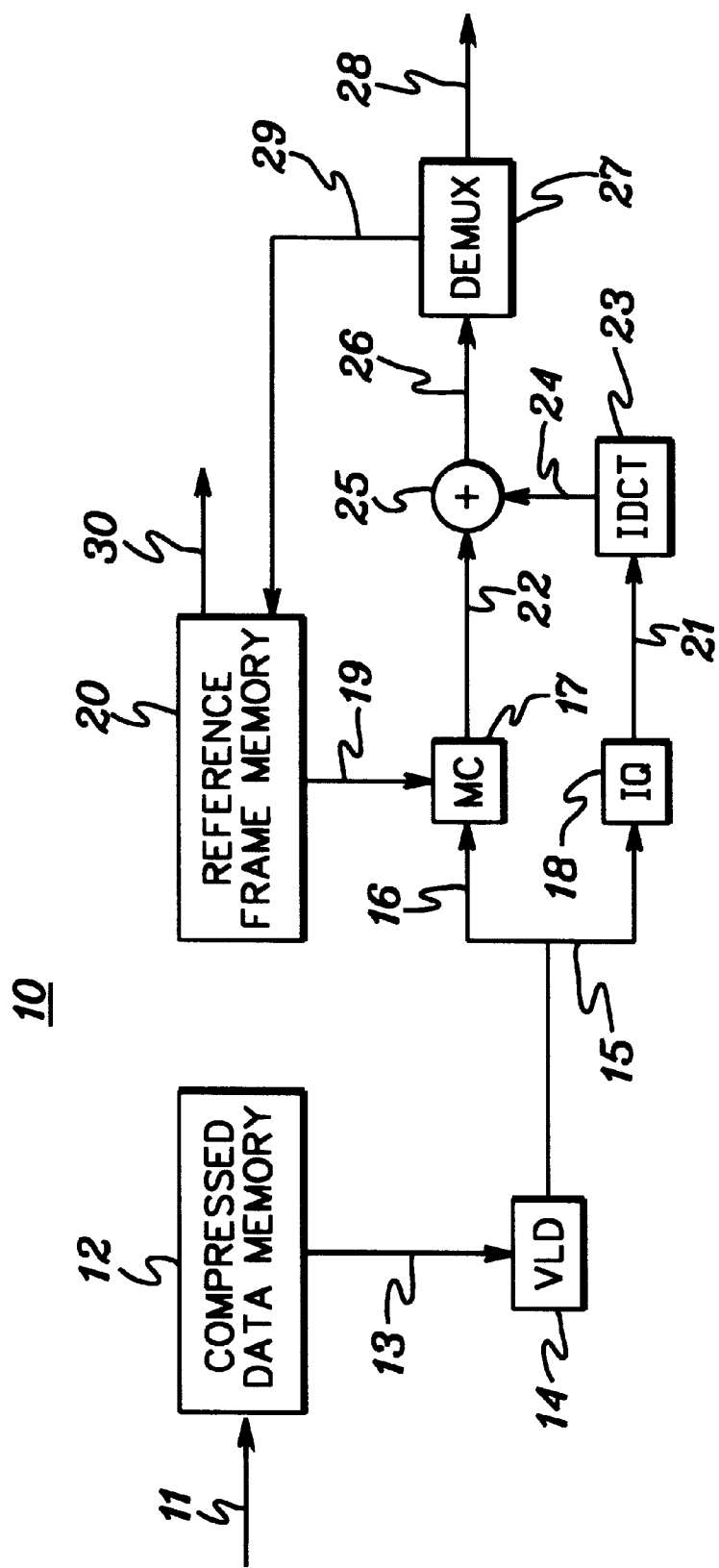
FIG. 3 depicts a block diagram of a video decoder.

FIG. 3 shows a diagram of a conventional video decoder. The compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as the signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Various techniques have been proposed for reducing memory requirements of a decode system by storing decoded video data in compressed form. One such technique is described in the above-incorporated patent application entitled "Multi-Format Reduced Memory MPEG-2 Compliant Decoder," Serial No. 08/958,632. This co-pending application relates to a method for reducing memory requirements for frame buffer storage for an MPEG-2 decoder, and to editing or modifying the video output, e.g., from a 4:3 form factor of television to a 16:9 format of motion pictures. A significant aspect of the technique is decimation of the B-coded pictures within hardware of the video decoder. This technique includes first motion compensating the P-coded and B-coded pictures, followed by decimating the B-coded pictures during the decode phase, and increasing the size of scan line fetches for the I-coded and P-coded pictures to enable their horizontal decimation during the display phase.

Figure 4:
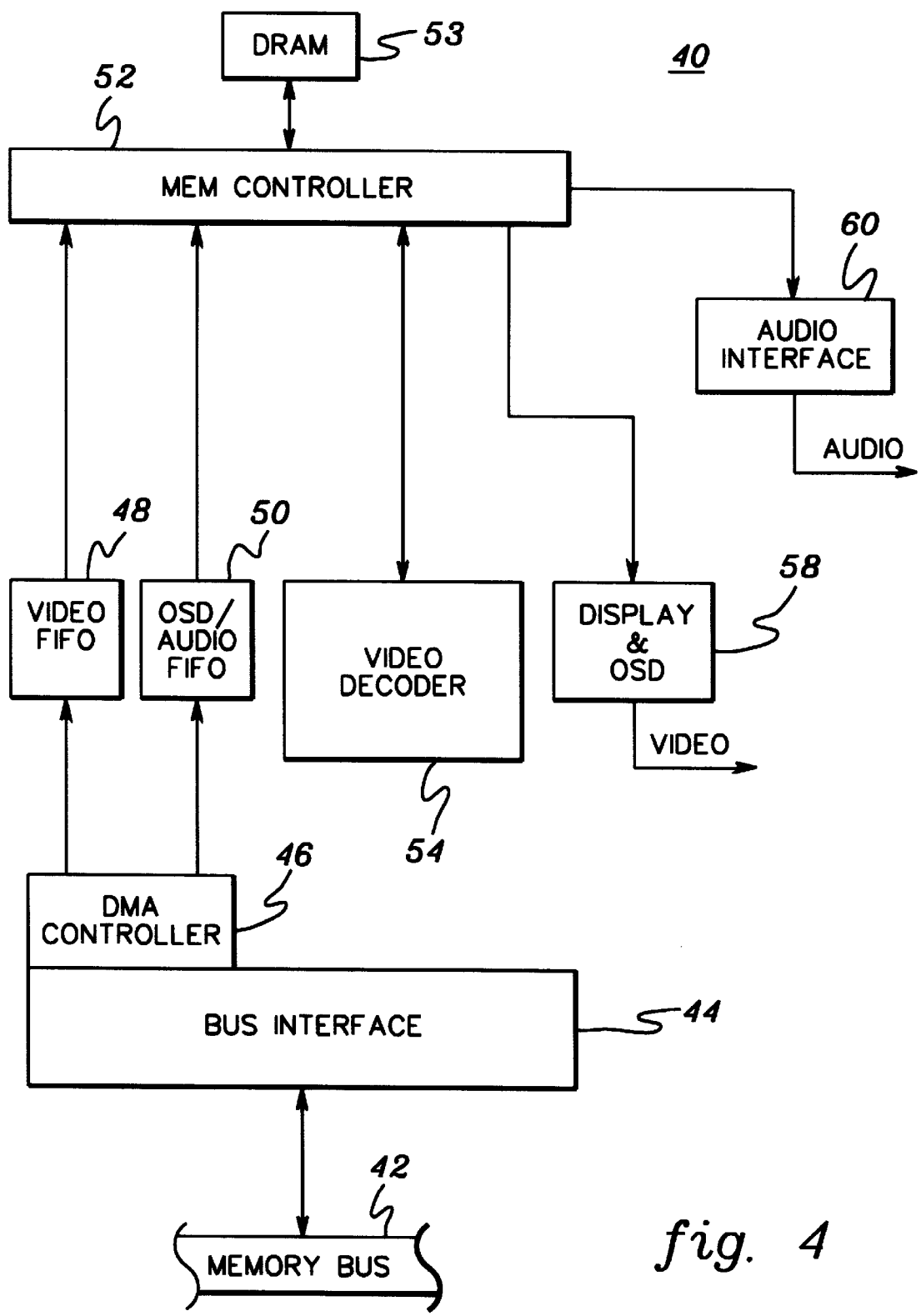
FIG. 4 is block diagram of a video decoding system to employ the principles of the present invention.

A decode system, generally denoted 40, to employ the present invention is depicted in FIG. 4. System 40 includes a bus interface 44 which couples the decode system 40 to a memory bus 42. MPEG encoded video data is fetched from bus 42 by a DMA controller 46 which writes the data to a video First-In/First-Out (FIFO) buffer 48. The DMA controller also fetches on-screen display and/or audio data from PCI bus 42 for writing to an OSD/audio FIFO 50. A memory controller 52 will place video data into a correct memory buffer within dynamic random access memory (DRAM) 53. MPEG compressed video data is then retrieved by the video decoder 54 from DRAM 53 and decoded as described above in connection with FIG. 3. Conventionally, the decoded video data is then stored back into the frame buffers of DRAM 53 for subsequent use as already described. When a reference frame is needed, or when video data is to be output from the decode system, stored data in DRAM 53 is retrieved by the MEM controller and forwarded for output via a display & OSD interface 58. Audio data, also retrieved by the memory controller 52, is output through an audio interface 60.

As discussed initially herein, this invention addresses the need for a decoding system with integrated scaling capability which can scale the size of an MPEG-2 video presentation by a predetermined reduction factor. At the same time, the invention preferably allows for reduction in external memory requirements for full-frame buffer storage as well, e.g., using the above-described B frame memory reduction technique. As the MPEG-2 video decoder market becomes more and more competitive, the need for high level of feature integration at the lowest possible cost is important to achieving success in the marketplace. The present invention acknowledges this by providing a scaling mode to reduce the size of a display picture by a predefined factor, such as 2 and/or 4 in both the horizontal and vertical axis.

Figure 5:
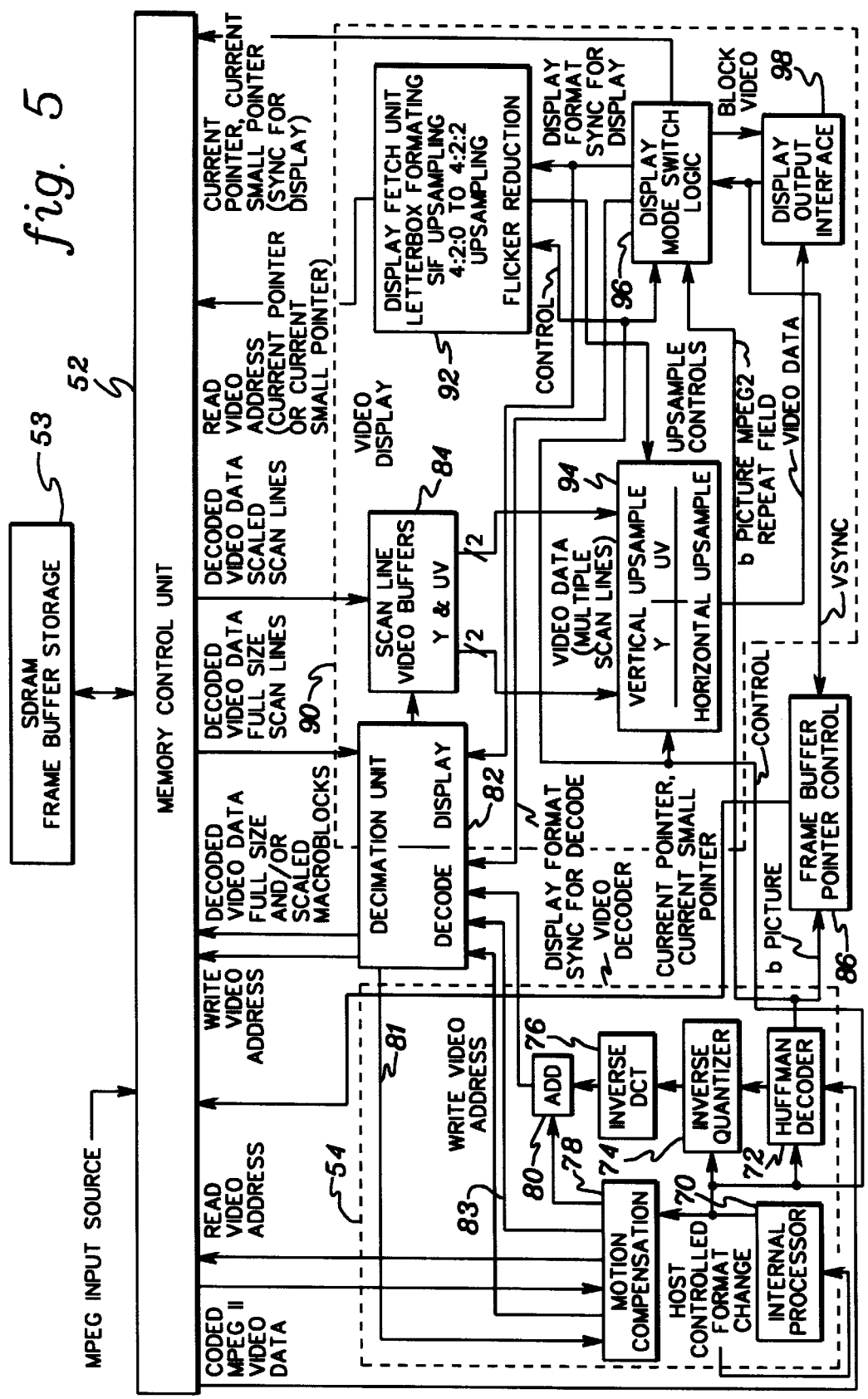
FIG. 5 is a detailed embodiment of a video decoding system in accordance with the principles of the present invention.

FIG. 5 depicts one embodiment of a video decode system in accordance with the principles of the present invention. This video decode system includes external memory 53, which in the embodiment shown comprises SDRAM frame buffer storage. Memory 53 interfaces with a memory control unit 52. Memory control unit 52 receives decoded video data from a video decoder 54 and provides video data for display through video display unit 90. In accordance with the principles of the present invention, video decode system 65 of FIG. 5 includes numerous features which implement a video scaling mode capability.

For example, decimation unit 82 is modified to include both a normal video decimation mode and a video scaling mode. Frame buffers 53 are modified to accommodate storage of decoded video data in either full-frame format or a combination of full-frame format and scaled video format. Display mode switch logic 96 is provided within video display unit 90 to facilitate seamless switching between normal video mode and scaled video mode. Frame buffer pointer control 86 is modified to provide the correct frame buffer pointers based on the novel partitioning of the frame buffers when in normal video mode and when in scaled video mode. Further, as described in the above-incorporated, co-filed United States patent application, a flicker reduction mechanism is preferably integrated within video display unit 90, and in particular within vertical upsample logic 94. Each of these features is described in detail below, with the exception of flicker reduction which is described in the co-filed application.

Operationally, an MPEG input video source is fed through memory control unit 52 as coded MPEG-2 video data to the input of video decoder 54. Decoder 54 includes a Huffman decoder 72, Inverse Quantizer 74, Inverse DCT 76, Motion Compensation 78 and adder 80, which function as described above in connection with the video decoder of FIG. 3. An internal processor 70 oversees the video decode process and, in accordance with the principles of the present invention, receives a signal from a host system whenever the host desires to switch the video display between, for example, normal video display and scaled video display. This signal is referred to in FIG. 5 as a "host controlled format change" signal. In response to host format changes, control signals are sent from internal processor 70 to Huffman decoder 72, Inverse Quantizer 74, Motion Compensation 78, as well as to upsample logic 94, display fetch unit 92 and display mode switch logic 96 within video display 90. Again, these control signals direct the video decode system in accordance with the principles of the present invention (and as described below) to switch the display output between, for example, normal video mode and scaled video mode.

Full size macroblocks of decoded video data are sequentially output from video decoder 54 to decimation unit 82 where, in one embodiment, the full size macroblocks undergo one of two types of compression. First, if full size video is desired, then decimation of the B-coded pictures only is still preferably performed as described in the above-incorporated application entitled: "Multi-Format Reduced Memory MPEG-2 Compliant Decoder". In this normal video mode, decimation is a process of reducing the amount of data by interpolating or averaging combined values to get an interpolated pixel value. Interpolation reduces the number of pixels, and therefore, less external memory is required in the overall system. In a second mode, decimation unit 82 performs picture scaling in accordance with the principles of this invention. By way of example, the type of scaling employed may reduce the overall size of the display picture by a factor of 2 or 4 in both the horizontal and vertical axis.

Along with providing decimation unit 82 with a stream of decoded full-size macroblocks, video decoder also sends a "motion compensation unit block complete" signal on line 83, which lets decimation unit 82 know when a macroblock has been completely decoded. Similarly, decimation unit 82 provides a "decimator busy" signal on line 85 to motion compensation unit 78 of video decoder 54. This "decimator busy" signal informs the motion compensation unit when the decimation unit is busy and when the unit has completed its operations, after which the motion compensation unit can proceed to the next macroblock.

Motion compensation unit 78 of video decoder 54 provides read video addresses directly to memory control unit 52, and write video addresses to decimation unit 82 for writing of decoded video data (full size) and/or scaled macroblocks to external memory 53. In parallel with the read video address and write video address, pointers are provided by frame buffer pointer control 86 to the memory control unit. These pointers define which frame buffer areas within SDRAM 53 are to be accessed by a given read video address or write video address in accordance with the partitionings of the frame buffer memory space pursuant to this invention (as described further below). These pointers are referred to in FIG. 5 as current pointer and current small pointer, with current pointer comprising a pointer for a full size macroblock, and current small pointer comprising a pointer for a scaled macroblock.

Decimation unit 82 receives the decoded full-size macroblocks, buffers the information internally and if scaling mode is activated, performs scaling as described below. In a normal mode, decimation unit 82 outputs decoded video data full-size macroblocks to memory control unit 52 for storage in frame buffers 53. When in scaling mode, decimation unit 82 scales the full-size macroblocks and outputs scaled macroblocks to memory control unit 52 for storage in frame buffers 53.

Frame buffer pointer control 86 is significant and controls rotation of the frame buffers, i.e., frame buffer assignments, when in normal video mode and video scaling mode in accordance with the principles of the present invention (described further below).

As described in the above-incorporated applications, decimation unit 82 also functions as part of video display unit 90 when retrieving data for display. Specifically, decoded video data comprising full-size scan lines is retrieved from frame buffer storage 53 and fed through decimation unit 82 for B-frame re-expansion of pictures as explained in the above-incorporated patent application entitled "Multi-Format Reduced Memory Video Decoder With Adjustable Polyphase Expansion Filter." This is done so that consistency is maintained for the video within a group of pictures, and thus reduced resolution of any one picture is not perceptible. After re-expansion, the full-size scan lines are provided to display output interface 98.

Alternatively, when in video scaling mode, decoded video comprising scaled scan lines is retrieved from frame buffer storage 53 and fed directly to scan line video buffers 84. The scan lines are divided between luminance and chrominance data and both a current scan line and a prior scan line are fed from scan line video buffers 84 to vertical and horizontal upsample logic 94. Upsample controls are received from display fetch unit 92, which coordinates letterbox formatting, SIF upsampling, 4:2:0 to 4:2:2 upsampling, and flicker reduction (in accordance with the principles of the above-incorporated, co-filed patent application).

Display fetch unit 92 provides the read video address for retrieval of scan lines from frame buffer storage 53. A "current pointer, current small pointer" synchronization (sync) signal for display is received by memory control unit 52 from display mode switch logic 96 of video display unit 90. As noted above, the current pointer, current small pointer signal points to the particular frame buffer area from which scan lines are to be retrieved, while the read video address signal designates the particular scan lines to be retrieved within that frame buffer area.

Display mode switch logic 96 is provided in accordance with the principles of the present invention in order to ensure seamless switching between, for example, scaled video mode and normal video mode. Logic 96 receives as input a control signal from internal processor 70 of video decoder 54, as well as a vertical synchronization (VSYNC) signal (from display output interface 98) and a B picture "MPEG-2 repeat field" signal from Huffman decoder 72 of video decoder 54. VSYNC is an external synchronization signal that indicates the start of a new display field. Output from display mode switch logic 96, in addition to the current pointer, current small pointer sync for the display, is a "display format sync for display" signal fed to display fetch unit 92, as well as a "display format sync for decode" signal fed to the decode logic of decimation unit 82. Display mode switch logic 96 also outputs a "block video" signal to display output interface 98 which is employed, in accordance with the principles of the present invention, to block one display frame to keep noise from the display when switching between display modes. Video data is received at the display output interface from upsample logic 94. The decimation unit, frame buffer partitioning, frame buffer pointer control and display mode switch logic, all implemented in accordance with the principles of this invention, are described in greater detail below with reference to FIGS. 6–10.

First, the frame buffers. The frame buffers are used to store the constructed pictures for display, as well as for prediction of subsequent pictures. Since a B picture is not used for prediction, its frame buffer is available for use after the picture has been displayed. For I or P pictures, the frame buffer needs to be held after display, particularly for predicting B pictures.

Figure 6:
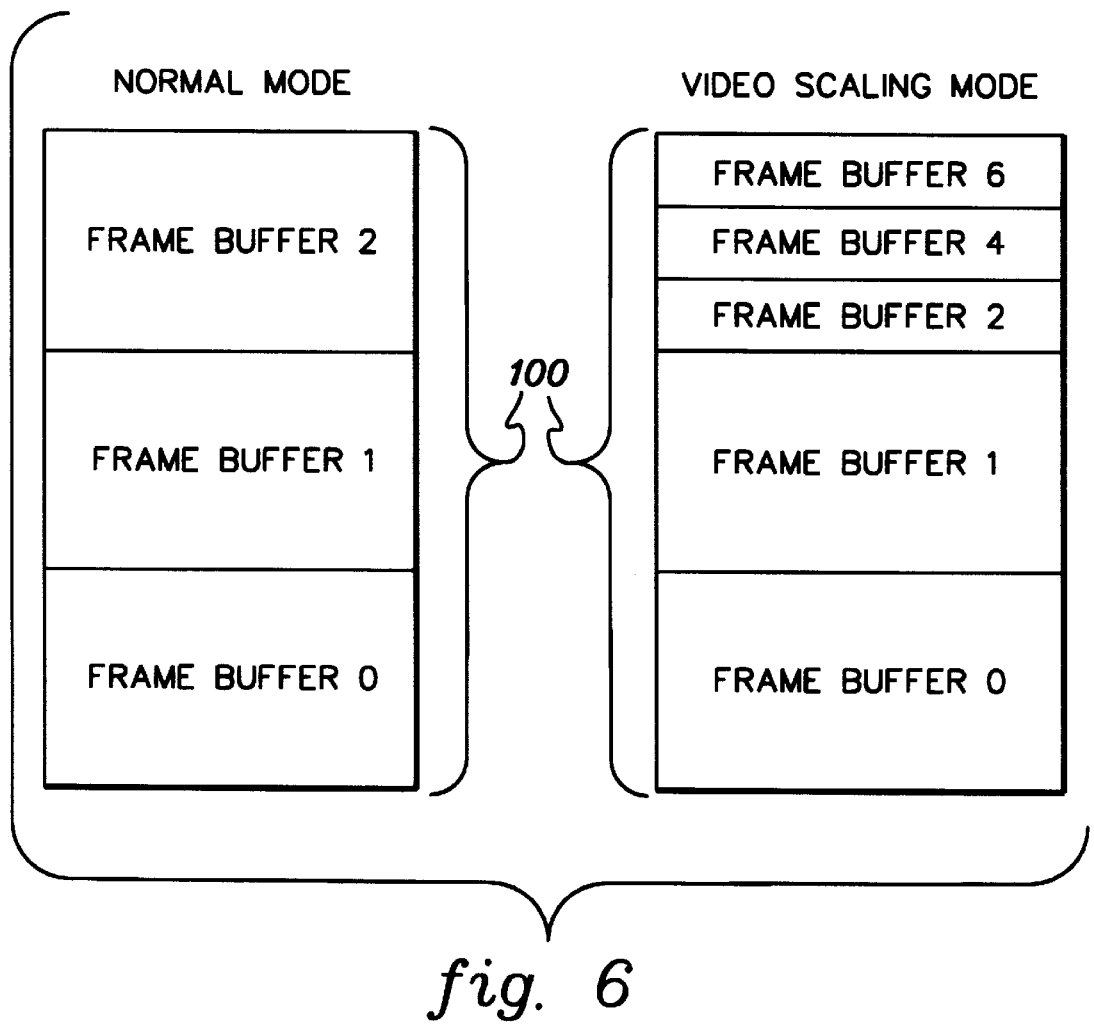
FIG. 6 illustrates frame buffer subdivision in a normal mode and in a video scaling mode in accordance with the present invention.

FIG. 6 depicts frame buffer allocation for both normal video mode and scaled video mode in accordance with the principles of this invention. In normal mode, there are three frame buffers to support the decoding and display processes. Frame buffer 0 and frame buffer 1 are allocated for I and P pictures, while frame buffer 2 is assigned to B pictures. The frame buffers are tagged by buffer pointers, i.e., the current pointers from frame buffer pointer control 86 of FIG. 5.

In the scaled video mode, at least five frame buffers are employed. Frame buffer 0 and frame buffer 1 again accommodate full size I and P picture video. The at least three other buffers, which are labeled frame buffer 2, frame buffer 4 and frame buffer 6 in the example shown, are tagged by small pointers generated by the frame buffer pointer control. These small buffers are mainly used for display purposes when in scaled video mode. The buffers are small size in order to fit the video scalings. When decoding an I or P picture, the constructed picture is stored into either buffer 0 or buffer 1 depending upon whichever is available. At the same time, a scaled down version of the same picture is stored into one of the smaller buffers, i.e., frame buffer 2, frame buffer 4 or frame buffer 6. The full size video is then used for prediction, while the small sized video in the small frame buffers is used for display of the scaled down picture.

The frame buffers are configured by microcode during initialization of the video decode system. A memory base address is assigned to each frame buffer, and these memory base addresses are selected by the buffer pointers generated by frame buffer pointer control. The read and write video addresses refer to specific addresses within a selected frame buffer. Unless otherwise indicated, the term "frame buffer" is used herein below as inclusive of all frame buffer memory configured during initialization. "Frame buffer area" refers to one of the specific frame buffers depicted in FIG. 6.

The video display operates in real time, and therefore, frame buffer pointers must be switched according to the VSYNC timing. Since decoding is always ahead of the display, a frame buffer must be made available to store the decoded picture. Therefore, the frame buffer pointers must be switched before decoding starts. To avoid the disturbance to the display frame buffer, a copy of the display buffer pointer is maintained. The buffer switching time is at the beginning of each picture decode. The display buffer pointer is also changed at that time, however, it will not be used until copy display pointer time which is the beginning of picture display. One embodiment of normal mode buffer pointer rotation is described below.

The following assumes four buffer pointers, with each pointer containing two bits to indicate which one of the three frame buffers (buffer 0, 1 and 2) is being accessed. current pointer—indicates the frame buffer to be used for the constructing picture;

display pointer—indicates the frame buffer to be used for the display;

future pointer—indicates the frame buffer to be used for the backward prediction; and past pointer—indicates the frame buffer to be used for the forward prediction.

At startup, the future pointer is initialized to "1" and the other pointers are set to "0". At the beginning of an I or P picture decode, the value from the past pointer is loaded into the current pointer and the value from the future pointer is loaded into the display pointer. The values in the future pointer and the past pointer are swapped. If the decoding picture is a B picture, the current pointer and the display pointer are set to "2".

Frame buffer 2 is reserved, in one example, for the B pictures. The future pointer and past pointer remain unchanged. Pointer switching in normal mode is described in greater detail in U.S. Pat. No. 5,668,599 by Cheney et al., entitled "Memory Management For An MPEG-2 Compliant Decoder," the entirety of which is hereby incorporated herein by reference.

Figure 7A:
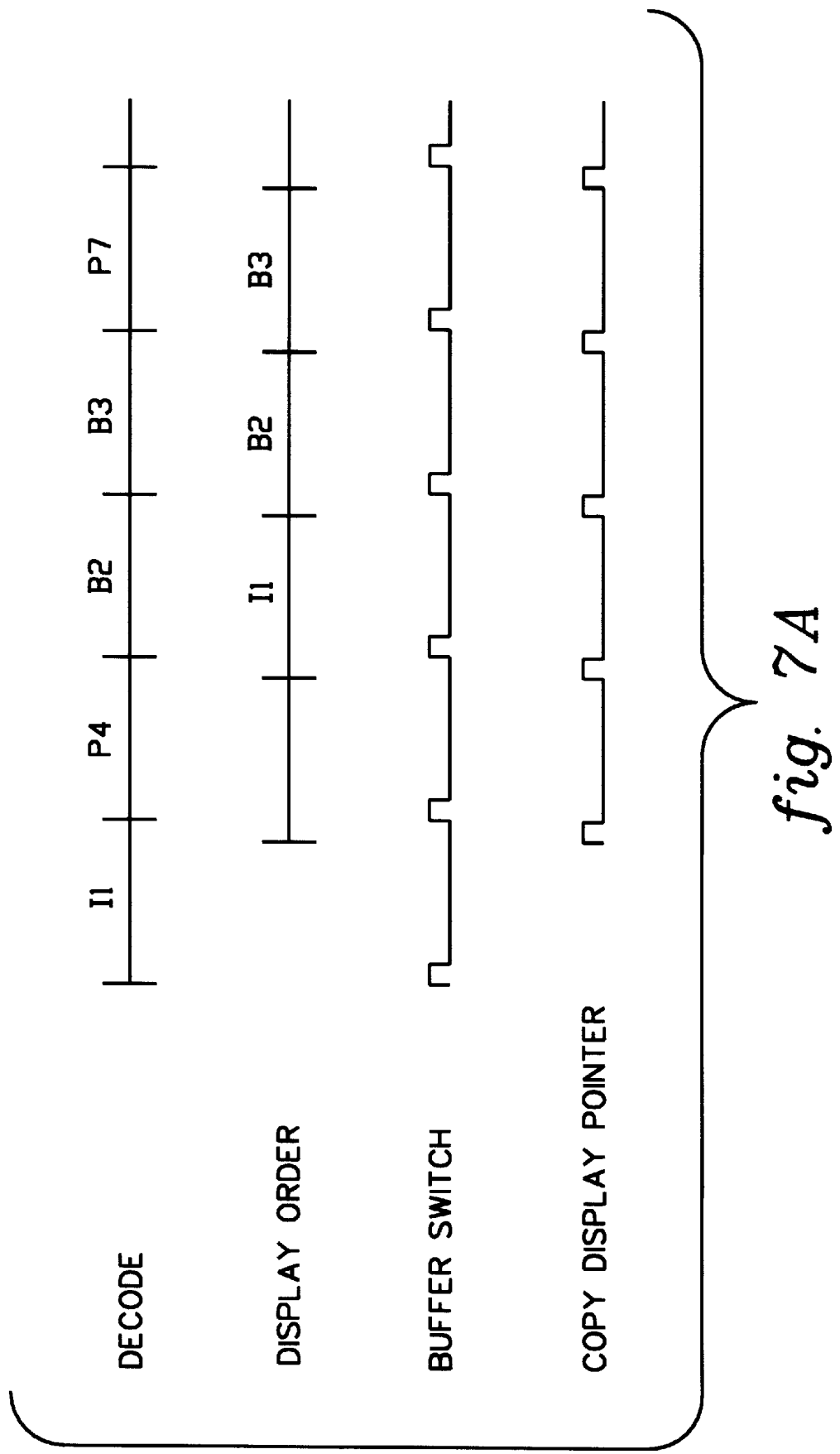
FIG. 7*a* is a timing diagram showing delayed display timing in a video scaling mode in accordance with the principles of the present invention.

In scaled video mode, the display time of a picture is delayed by an additional field time in accordance with the present invention. The purpose of this delay is to decouple the decode and the display processes so that the decoded scaled video can be placed anywhere on the screen. FIG. 7a depicts one example of the delayed display timing in scaled video mode. This display timing is adjusted dynamically according to the mode, i.e., whether normal mode or scaled video mode. The one field time delay is needed in accordance with this invention to properly manage the buffers. At least five buffers are again assumed in the video scaling mode. As described above, two of these five buffers comprise full-size frame buffers, and are labeled frame buffer 0 and frame buffer 1 in FIG. 6. These full-size frame buffers are the same as the corresponding buffers used in normal video mode. The at least three small frame buffers, i.e., frame buffer 2, frame buffer 4 and frame buffer 6, are allocated in the same memory space occupied by frame buffer 2 used in the normal video mode. These three small frame buffers are controlled by a different algorithm than described above.

Specifically, four additional pointers are used in scaled video mode. These pointers are:

small current pointer—indicates a small buffer for the decimated constructing picture;

small display pointer—indicates a small buffer for the display;

small future pointer—indicates the small buffer for the future display; and small transition pointer—indicates the small buffer for the transition.

When the decoder is initialized, the small current pointer, small display pointer, small future pointer and small transition pointer are set to 0, 2, 4 and 6, respectively. At the start of each picture decoding, the small current pointer is loaded from the small transition pointer and the small transition pointer is loaded from the small display pointer. If the decoding picture is a B picture, then the small display pointer is loaded from the small transition pointer and the small future pointer remains unchanged. If the decoding picture is an I or P picture, the small display pointer is loaded from the small future pointer and the small future pointer is loaded from the small transition pointer. One example of small frame buffer switching in accordance with the present invention is depicted in FIG. 7*b*.

The full-size frame buffers, frame buffer 0 and frame buffer 1, are switching as if the decoder is running in normal mode. These two buffers are needed for prediction, but are not for display in scaled video mode. When an I or P picture is being decoded, the picture is stored in both buffers indicated by the current (full frame) pointer and the small current pointer. During a B picture decoding, frame buffer 2 indicated by the current (full frame) pointer will not be used. Only the small frame buffer identified by the small current pointer is used for the decimated picture. In normal mode, the display pointer is used for display, while in scaled video mode, the small display pointer is used. The two buffer switching algorithms operate simultaneously at the beginning of each picture decoding. The buffer pointers are simply selected depending upon which mode the decoder is in.

Figure 8:
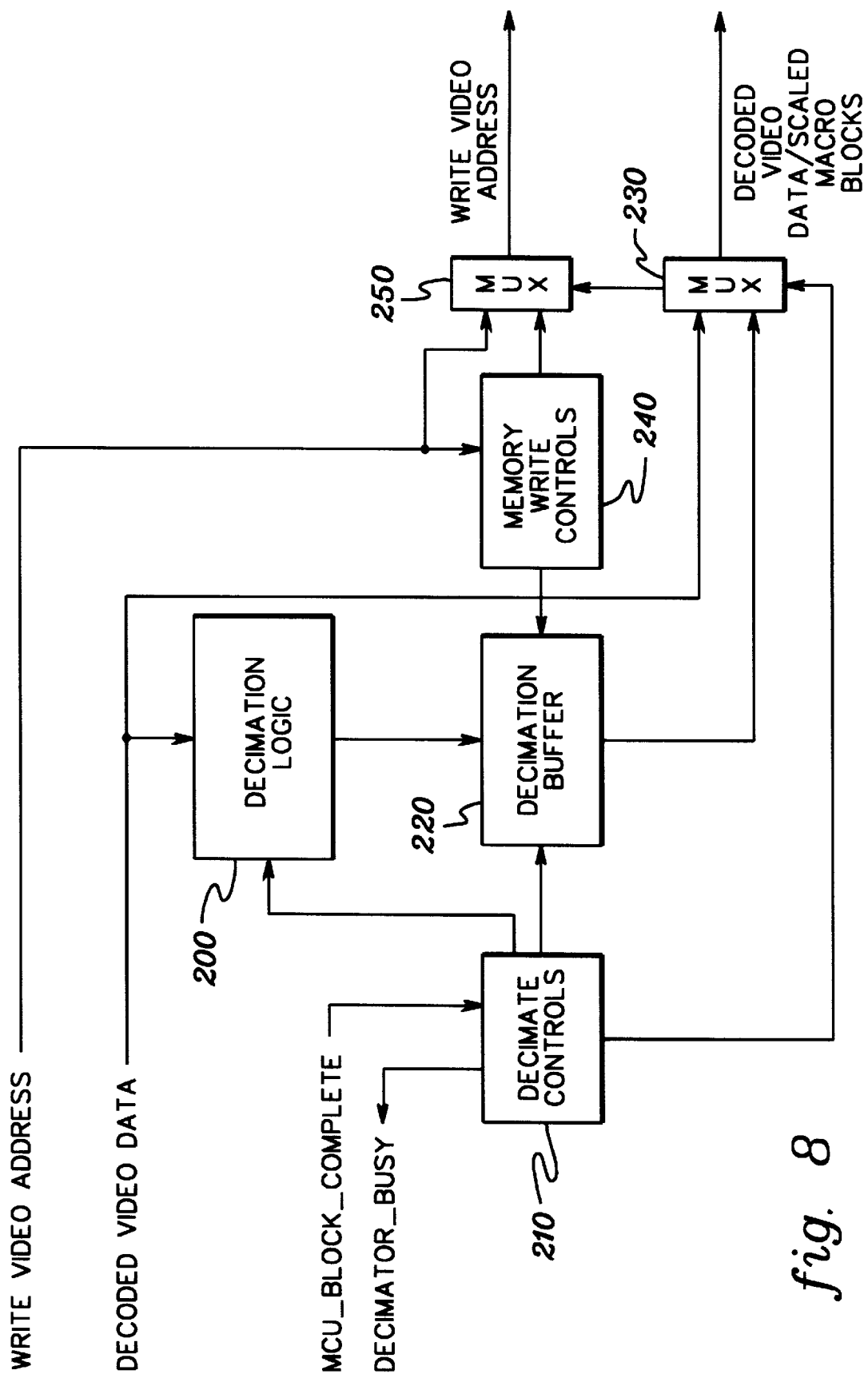
FIG. 8 is a block diagram of one embodiment of a decimation unit in accordance with the principles of the present invention for the video decode system of FIG. 5.

Next, FIG. 8 depicts one embodiment of a decimation unit 82 (FIG. 5) employed in accordance with the present invention.

In previous implementations of the decode decimation unit, e.g., described in the above-incorporated patent application entitled "Multi-Format Reduced Memory MPEG-2 Compliant Decoder", the decimation unit was limited to operating on B pictures only, for either letterbox or memory reduction purposes. In a scaled video mode as presented herein, however, the decode decimation unit processes all picture types. This is desirable in order to save memory bandwidth at display time, since (in one embodiment) scaled pictures and multi-plane, high resolution OSD graphics may be mixed at the output.

In the embodiment of FIG. 8, the decimation unit includes decimation logic 200, which receives the decoded video data from the video decoder and outputs a decimated data flow to a decimation buffer 220. Output from decimation buffer 220 is multiplexed 230 with the undecimated, decoded video data received from the video decoder such that multiplexer 230 outputs the decoded video data, as well as the scaled macroblocks for storage in frame buffers 0, 1, 2, 4 and 6 as described above when in scaled video mode. The write video address from the motion compensation unit of the video decoder is fed to memory write controls 240 within the decimation unit, which control writing of data from decimation buffer 220. The write video addresses, either with or without decimation scaling, are also output through a multiplexer 250 to the memory control unit (see FIG. 5).

Multiplexers 230 & 250 are controlled by decimate control signals 210. The decimate control logic receives as input a signal called "MCU_block_complete" from the motion compensation unit of the video decoder. This signal indicates when the decimator can begin to write the scaled macroblock. The decimator informs the motion compensation unit that it is currently busy through a signal labeled "decimator_busy".

For a given macroblock, there are two phases. One phase is for the luminance, and the other phase is for chrominance. Each phase requires a write of one full-sized macroblock and one scaled macroblock, again, assuming scaled video mode.

Various specific changes to the decimation hardware/process described in the above-incorporated "Multi-Format Reduced Memory MPEG-2 Compliant Decoder" application are intended herein. One change in the data flow of the decimation process is the addition (in one example) of a 4 to 1 horizontal reduction, which is implemented in the horizontal decimate function of the decimation logic. This is to support $\frac{1}{16}$ size scaling.

Another change is to increase the decimation buffer size to 32×32 bits. As I and P pictures are processed, the full-sized macroblock is written to memory, while the decimator scales down the macroblock at the same time and stores a small macroblock in the decimation buffer 220. After the full-sized macroblock is written to memory, the decimator writes the scaled macroblock to another buffer location within memory (i.e., frame buffer 2, frame buffer 4 or frame buffer 6 in the example above). The larger decimation buffer allows for the storing of the small macroblock.

The decimate state machine logic is also changed to allow two modes of operation, i.e., again assuming a scaled video mode. The first mode is B picture processing and the second mode is reference picture processing. For B picture processing, only the small macroblocks are written to memory through decimation buffer 220. The data is paced through the decimation unit as fast as the motion compensation unit can deliver it, since the decimation buffer can hold a complete scaled macroblock. For reference picture operations, the full-size macroblocks are written to memory first through multiplexer 230, followed by the writing of the scaled macroblocks. This requires the data flow to be paced by the memory control unit responding to requests for writing.

Since the size of the source compressed image may vary, there are exceptions to the above process. The decimator is only required if some type of reduction is needed to form a scaled picture. Certain video sources will already be small in size, and one dimension, or both dimensions may not require scaling. For example, it is common to have 352×240 sized images (typical MPEG-1 size). In this case, it would be unnecessary to do any decimation to provide a ¼ scaling. For reference frames, the motion compensation unit is required to write the full-sized macroblock to the reference frame buffer in memory, and then to the display frame buffer in memory, since the display process is only operating on the display frame buffer during scaling.

For the same image size to be reduced to 1/16 scaling, there would need to be a decimation step. Once again, there is an exception in this case.

One of the objects of the scaling feature is to remove interlacing artifacts. On true MPEG-1 images, there is no interlacing since the pictures are exclusively frame encoded. MPEG-2 can allow interlaced pictures of the same resolution (352×240) and the decimator only uses the top field picture to create the scaled macroblock. The bottom field is discarded. Therefore, for a reference picture, the MCU would be required to write the macroblock for the top field picture to both the reference frame buffer and display buffer. For B pictures, the MCU would only need to write the top field picture into the display frame buffer.

The video decode system in accordance with the present invention provides smooth transitions when entering and exiting small picture mode. Since frame buffer 2 is used for capture and display of small picture images (including reference and B pictures) when in video scaling mode, care must be taken to prevent interference between the decode and display processes at the time of display format switching. Also, there is a latency adjustment of one field time that must take place during the transition. Normal display modes have a 1.5 frame latency between decoding and displaying reference pictures, and a 0.5 frame latency for B pictures. In small picture mode, the reference frame latency is changes to two frames and the B frame latency is changed to one frame.

For the display format change to occur seamlessly, the display must not be in the process of displaying a B picture when the transition occurs, otherwise the picture will appear disturbed. Therefore, transition must take place when a reference picture is being displayed. This is forced to happen by the microcode during a sequence header, when the first frame of the new sequence is a reference frame, and the display is acting on the last frame of a previous sequence.

During the transition into and out of small picture mode, the hardware must make the adjustment in latency without disturbing the decode or display process. Frame sync must be adjusted to the new mode. Further, field parity must be maintained. As a result of making the adjustment into small picture mode, a delay of one frame time is introduced, which may effect PTS comparison.

Subsequently, a skipped frame may be required in order to make up the time difference. This only occurs when entering small picture mode. When leaving small picture mode, there is no loss of synchronization. The transition could also come at a time when a picture is already being skipped or repeated.

Figure 9:
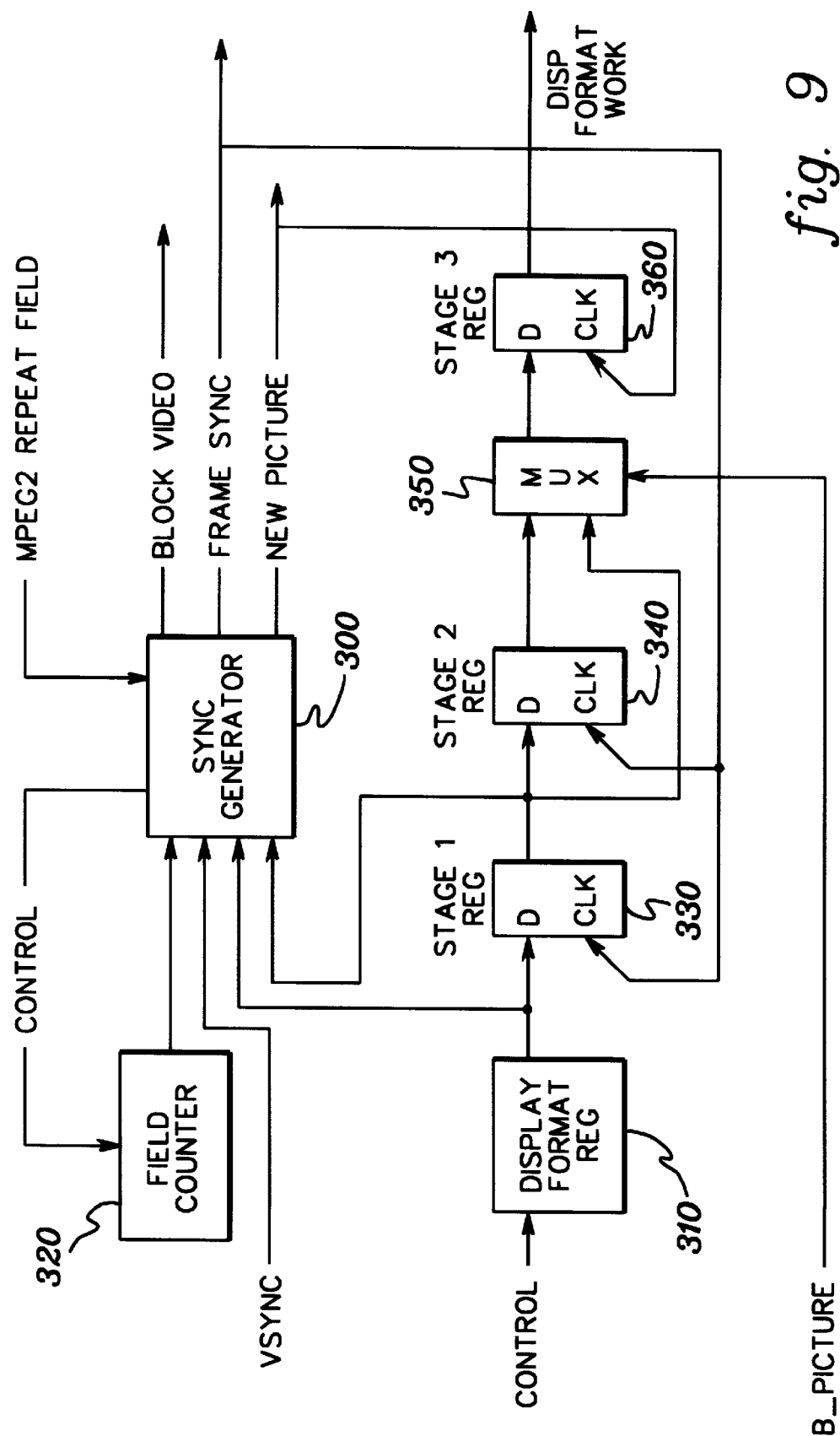
FIG. 9 is a block diagram of one embodiment of display mode switch logic in accordance with the principles of the present invention for the video decode system of FIG. 5.

Referring to FIG. 9, the display format change signal is written asynchronously by the host. The format is received as a control signal into a display format register 310, and microcode waits until processing the sequence header before writing the information into display format register 310. This information is then seen by sync generator 300, as well as register stages 330, 340 and 360.

Register stage 1 330 captures the information at the next frame sync. Decode processes use the stage 1 register 330, and the display processes use the stage 3 register 360.

Field counter 320 simply counts down from a starting number of fields in a frame to a value of 1, and then repeats. Counter 320 is loaded by sync generator 300 via a control signal as shown. Sync generator 300 also receives the VSYNC signal, as well as the output of stage 1 register 330. Sync generator 300 creates three signals, namely, a "frame sync" signal, a "new picture" signal and a "block video" signal. The "frame sync" signal indicates to the decode process when to begin decoding a new frame. The "new picture" signal indicates to the display process when to begin displaying a new frame. "Block video" is used to selectively suppress one frame of video image during transition of the video decode system from a normal frame to a scaled frame. The frame sync and new picture signals are pulses that are created once every two field times. In normal mode, the signals are 180° out of phase, but in scaling mode (in accordance with this invention) the signals are in phase. This is described further below in connection with the flowchart of FIG. 10.

In all cases involving a switch into scaled picture mode, there is a repeated frame which is blocked from view at the display. The block is necessary due to buffer conflicts between the current reference frame and the reference frame that is currently being displayed. When video is blocked, the output of the decoder can be forced to a background color, such as black.

The latency adjustment is performed as soon as the stage 1 register changes. There is an absence of a frame sync which allows the current display frame to be scheduled to repeat. The sync generator then adjusts the frame sync to occur in phase with the new picture, causing the latency adjustment. During the repeated reference frame, the video is blocked for one frame time.

Figure 10:
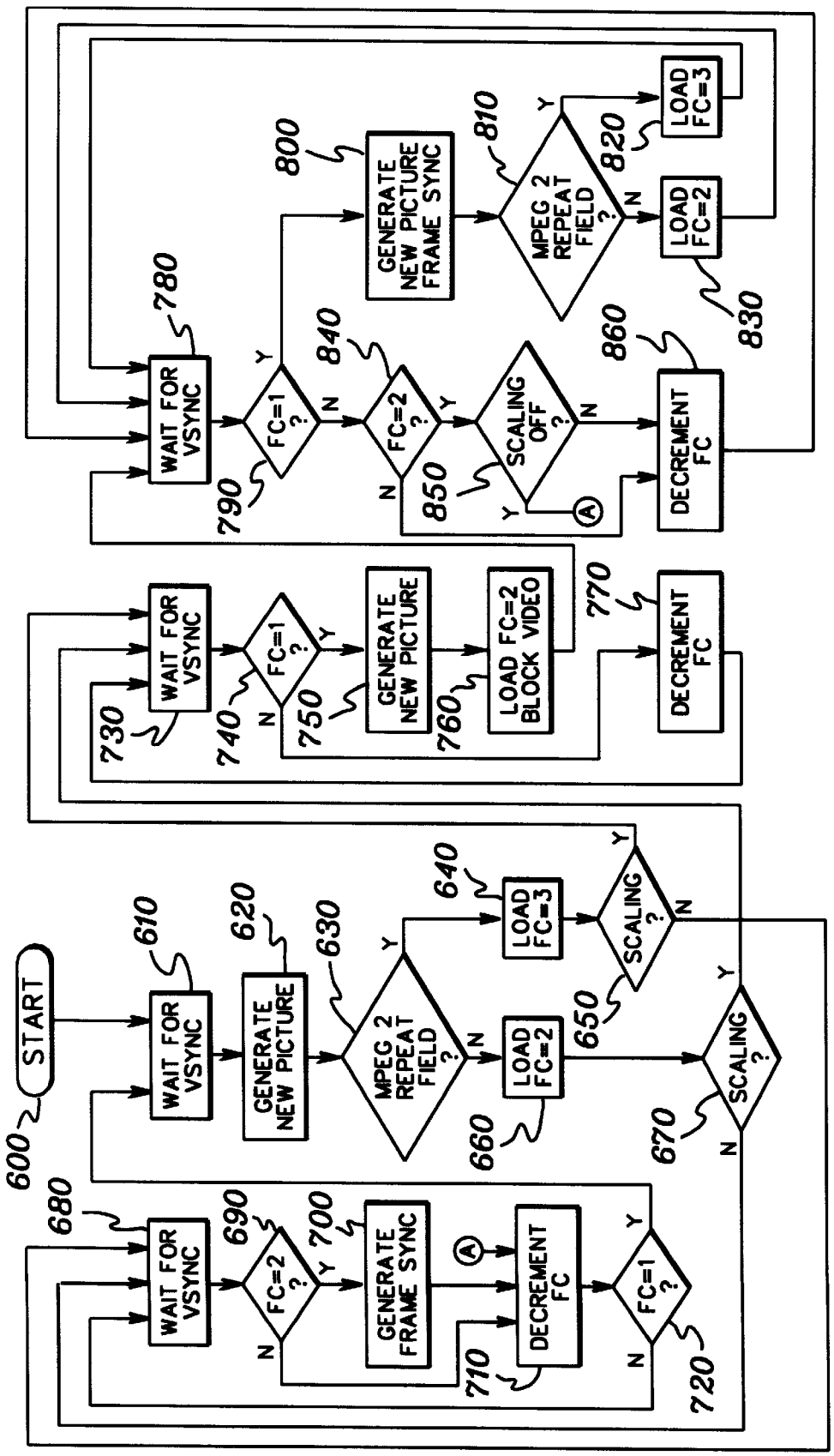
FIG. 10 is a flowchart of one embodiment of processing implemented by the sync generator of FIG. 9 in accordance with the principles of the present invention.

FIG. 10 is a flowchart of one embodiment of processing implemented by sync generator 300 (FIG. 9).

With initiation 600, processing waits for a VSYNC signal 610 representative of the start of a new field. Upon receipt of the VSYNC signal, processing generates a "new picture" sync signal and inquires whether the field is being repeated based on received MPEG-2 syntax 630. The initial field counter (FC) value depends upon whether the field is to be repeated. If 3:2 pulldown is employed then the initial value of the field counter is 3 640, otherwise normal interlace is desired and the field counter is loaded with a value of 2.

Once the field counter is set, processing inquires whether scaling is to be implemented 650 and 670, respectively. If no, then the decode system is in non-scaling or normal video mode. In this case, processing waits for a next VSYNC signal 680 and then inquires whether the field count equals two 690. If no, (e.g., because the field counter was loaded with a value 3), the field counter is decremented 710 and processing waits for a next VSYNC signal 680. Once the field count equals 2, the "frame sync" signal is generated 700, after which the field count is decremented 710 and processing determines whether the field count value now equals 1 720. If the value equals 1, processing generates a "new picture" signal 620 after waiting for a new VSYNC 610.

Assuming scaling mode is desired, then processing proceeds from inquiry 650 or 670 to wait for a next VSYNC 730, after which determination is made whether the field count equals 1 740. If no, the field counter is decremented and processing returns to wait for a next VSYNC 730. If the field count value is 1, then a new picture sync signal is generated 750. Thereafter, the field counter is loaded with a value of 2 and the block video signal is generated 760. Again, the block video signal is output from the sync generator to the display output interface (see FIG. 5) for blocking of a next frame of video.

After sending the block video signal, processing enters a steady state, video scaling subprocess beginning by waiting for a next VSYNC signal 780, after which processing determines whether the field count equals 1 790. It no, processing inquires whether the field count equals 2 840, and again if no, processing decrements the field counter 860 and returns to wait for the next VSYNC signal 780. Otherwise, a determination is made as to whether the scaling command has now been turned off by the host system 850. If no, the field counter is decremented and processing waits for a next VSYNC signal 780. If the scaling mode has been switched off, then the field counter is decremented at instruction 710 in the non-scaling process described above.

If the field count equals 1 at inquiry 790, then processing generates both the "new picture" signal and the "frame sync" signal in the same phase. Again, to implement scaling it is necessary to change the latency between the decode process and the display process from one and a half frame times to two frame times for reference pictures, making the new picture signal and frame sync signal in phase. Processing then determines whether the MPEG-2 repeat field is set 810 to decide whether to load the field counter with a value of 2 830 or 3 820 depending upon whether normal interlacing or 3:2 pulldown is desired. This is necessary even though an adjustment in latency is made in order to accommodate any type of frame rate conversion. After setting the field counter, processing returns to wait for a next VSYNC signal 780.

Those skilled in the art will note from the above discussion that in order to implement smooth switching between normal mode and scaled video mode it is necessary to pass through a transitional phase before reaching the steady state scaling process. Further, it is necessary to adjust the frame sync signal to occur within the same phase as the new picture signal.

As noted briefly above, another aspect the present invention comprises providing anti-flicker logic within the video display unit for smoothing a display picture by reducing or minimizing flicker effects between adjacent pixels. One embodiment of this anti-flicker logic is described below with reference to FIG. 11.

A video decoder/display chip is required to display source material that after having been decoded still is not in proper format to directly send to chip outputs for, for example, CCIR 601 interlaced format display. Among the many sources that are considered to be less than CCIR 601 (full size), and would thus need to be post processed by a display unit, are those sources that are 240 or less horizontal lines for NTSC, and sources that are 288 or less horizontal lines for PAL. In addition to any horizontal upsampling that these sources may require, there are sources that need vertical upsampling so that they can be viewed at a CCIR 601 format. These small sources are sometimes referred to in the industry as SIF-sized. Thus, it has been common practice for MPEG decoder/display chips to include a circuit that is capable of performing such vertical and horizontal upsampling to both the luminance and chrominance components.

In a system as described hereinabove for downscaling video, this upsampling logic would be idle, given that any SIF-sized source signals would either be displayed at their original size, or further downsampled according to the actions of the decimator unit described above. A unique feature of a video decoding system in accordance with this invention, therefore, is that this would be idle logic is slightly modified to perform an anti-flicker function, which is important to the quality of the downsampled display.

When video of any particular size is downsampled, the contrast of color generally increases between any two adjacent pixels. It is important to the quality of the scaled down image to consider this increase of contrast along a vertical axis, especially if the contrast relates to the brightness difference of any two adjacent pixels, and keeping in mind that the decoder/display output is driving a CCIR 601 format, which as noted, is an interlaced format. These factors can combine to create a visually perceptible flicker in the display of the downscaled image.

In a decoder design where a video scaler unit is placed after a display unit has performed any upsample to a CCIR 601 format, removing this flicker effect would be difficult both in terms of memory bandwidth required, and logic area needed. to perform the flicker removal. Advantageously, the present invention thus provides anti-flicker logic incorporated within the upsample logic of a video decode system having integrated scaling capabilities. The invention can remove flicker without any significant addition of circuitry over what is already needed for SIF-sized source upsampling. In a preferred design, the upsampling logic is modified so that it can perform a multiplex of operations, one of which is flicker removal. To realize a variable detection threshold, and a variable level correction flicker removal circuit, only two adders and several multiplexers need be added to the luminance upsample logic. This anti-flicker logic performs a luminance difference calculation on adjacent lines of progressive image material, and adjusts the output luminance if the difference is above a selectable "detection threshold". The adjustments performed by scaling the difference value of the luminance, i.e., the same value used in the detection circuit, by a predetermined correction factor and adding the scaled "correction value" back into the original luminance value. This value is then used as the output luminance value.

The logic controls to coordinate production of this hybrid output are located in the display fetch unit. This unit is responsible for selecting which decoded scan lines are to be fetched/interpolated/weighted for any given display line to be output. Here, where the logic for the prior art was responsible for manipulation of the controls to create such displays as "letterbox format", or the upsampling of a SIF-sized picture to full size, a small modification is needed so that the current line of luminance to be displayed is fetched as well as the corresponding luminance line from the opposite field.

As shown in FIG. 11, these pixel values from scan line video buffer luminance 430 flow from the luminance video buffer through two registers 451 & 452, i.e., for the current video line and the previous video line, respectively. Within this embodiment of the anti-flicker logic of the present invention, an adder 453 subtracts the values of two adjacent pixels from the different scan lines and divides the difference by a correction ratio (i.e., scaling ratio) in general division block 454. As used herein, adjacent pixels comprise spatially adjacent current and previous pixels along a vertical axis in the same frame, but opposite fields.

The difference between the adjacent luminance values is also sent to test logic 456 which determines whether the difference is greater than a predefined flicker threshold, for example, set by internal processor 500 of the video decoder. In one embodiment, the detection threshold comprises an empirical value based on visual perception of flicker in the resultant video display. If the difference between the two pixel values is greater than the detection threshold, then AND gate 455 is activated to allow output from general division logic 454. This output is placed in correction register 457 for adding back into the main data flow path, e.g., through a MUX 482 providing output to adder 484 in conventional vertical upsample logic 480. After vertical upsampling, horizontal upsampling 482 is performed and output is provided to display 470. In parallel, the decoded video data scanned lines are also fed to scan line video buffer chrominance 440 where vertical and horizontal upsampling 460 are performed and output is provided to video display 470. Upsample controls, including flicker reduction controls, are provided by display fetch unit 420.

Note from the above discussion that detection and scaling for a correction amount are performed by the new anti-flicker logic which includes adder 453, test logic 456, divide logic 454, AND gate 455 and correction register 457. The final add of the correction amount with the original luminance value is performed within conventional vertical upsample logic 480 employing adder 484 within the upsample logic. As a final note, display fetch unit 420 uses inputs from the decoder controller to decide whether the video in process is progressive or interlaced, full size or SIF-sized, and to determine the target scaling factor, for example, scaled picture one half size or one quarter size.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An integrated video decoding system comprising:
   a video decoder and display subsystem for decoding an encoded stream of digital motion video data, said video decoder producing a decoded stream of digital motion video data;
   a decimation unit coupled to said video decoder and adapted to scale said decoded stream of digital motion video data for display;
   said display subsystem including upsampling logic for selectively placing the decoded stream of digital motion video data in an upsampled format;
   anti-flicker logic for reducing flicker between adjacent pixels of a display of a frame of said decoded stream of digital motion video data, said flicker resulting from said decimation unit's downscaling said decoded stream of digital motion video data for display and;
   wherein said anti-flicker logic is integrated with said upsampling logic, and employs in part said upsampling logic in reducing said flicker.

2. The video decoding system of claim 1, wherein said anti-flicker logic comprises means for interpolating a pixel color value between two adjacent pixels of said display when contrast between said two adjacent pixels is greater than a predefined flicker threshold.

3. The video decoding system of claim 1, wherein said upsampling logic includes means for evaluating contrast between said adjacent pixels, wherein said adjacent pixels comprise adjacent pixels along a vertical axis of the display.

4. The video decoding system of claim 3, wherein said upsampling logic comprises a luminance upsample logic circuit, and said means for evaluating comprises means for performing a luminance difference calculation on adjacent lines of said frame being displayed, and means for adjusting an output luminance to said display if the luminance difference calculation is above a predefined flicker threshold.

5. The video decoding system of claim 4, wherein said means for adjusting comprises means for performing scaling of the luminance difference calculation by a correction factor when said luminance difference is above said predefined flicker threshold, and for adding a resultant scaled correction value back to an original luminance value for a pixel of said adjacent pixels, said sum of said scaled correction value and said original luminance value comprising said output luminance for said pixel.

6. The video decoding system of claim 1, wherein said anti-flicker logic comprises means for monitoring luminance data of said decoded stream of digital motion video data and for applying a correction factor thereto upon detection of said flicker between said adjacent pixels of said display of the frame.

7. The video decoding system of claim 1, wherein said anti-flicker logic comprises hardware within a luminance vertical upsample circuit of a video display unit receiving said decoded stream of digital motion video data for presentation on said display, the luminance vertical upsample circuit comprising part of said upsampling logic.

8. The video decoding system of claim 1, wherein said anti-flicker logic comprises means for performing multi-line averaging of lines of said frame to be displayed whenever contrast between said multiple lines exceeds a predefined flicker threshold.

9. The video decoding system of claim 1, wherein said decimation unit is adapted to downscale said decoded stream of digital motion video data to at least one of one quarter or one half size.

10. Video display logic for a digital video decoding system, said video display logic comprising:
    upsample logic for selectively placing a decoded stream of digital motion video data in an upsampled format; and
    anti-flicker logic integrated with said upsample logic for reducing flicker between adjacent pixels of a display of a frame of said decoded stream of digital motion video data, wherein the anti-flicker logic employs in part the upsample logic in reducing said flicker, said flicker comprising visually perceptible frequency change between adjacent pixels of said display of said frame in interlaced format.

11. The video display logic of claim 10, wherein said upsample logic comprises luminance vertical upsample logic, and wherein said anti-flicker logic is coupled to said luminance vertical upsample logic for monitoring luminance contrast between adjacent pixels along a vertical axis of said display.

12. The video display logic of claim 10, wherein said anti-flicker logic comprises means for interpolating a pixel value between said adjacent pixels of said display when contrast between said adjacent pixels is greater than a predefined flicker threshold.

13. The video display logic of claim 12, wherein said anti-flicker logic comprises means for performing a luminance difference calculation on adjacent pixels of adjacent lines of said frame being displayed, and means for adjusting an output luminance to said display from said video display logic if the luminance difference calculation is above said predefined flicker threshold.

14. The video display logic of claim 13, wherein said digital video decoding system comprises means for scaling said decoded stream of digital motion video data prior to input thereof to said video display logic, and wherein said means for adjusting comprises means for performing scaling of the luminance difference calculation by a correction factor when said luminance difference is above said predefined flicker threshold, and for adding a resultant scaled luminance difference value back to an original luminance value for a current pixel of said adjacent pixels, said sum of said scaled luminance difference value and said original luminance value comprising said output luminance for said current pixel.

15. A method for processing an encoded stream of digital motion video data for display, said method comprising:
   decoding the encoded stream of digital motion video data to produce a decoded stream of digital motion video data;
   scaling the decoded stream of digital motion video data to downsize said decoded stream of digital motion video data and provide a downsized decoded stream of digital motion video data for display;
   employing upsampling logic for selectively placing the decoded stream of digital motion data in an upsampled format;
   employing anti-flicker logic for reducing a flicker between adjacent pixels of a display of a frame of said downsized decoded stream of digital motion video data, said flicker comprising visually perceptible frequency change between adjacent pixels resulting from said scaling of said decoded stream of digital motion video data for display and;
   wherein said anti-flicker logic employs in part said upsampling logic in reducing said flicker.

16. The method of claim 15, wherein said reducing comprises interpolating a pixel color value between two adjacent pixels of said display when contrast between said two adjacent pixels is greater than a predefined flicker threshold.

17. The method of claim 15, wherein said reducing comprises evaluating contrast between said adjacent pixels within said upsampling logic, and wherein said evaluating is performed along a vertical axis of the display.

18. The method of claim 17, wherein said upsampling logic comprises luminance upsample logic, and said evaluating comprises a luminance difference calculation on adjacent lines of said frame being displayed, and adjusting an output luminance to said display if the luminance difference calculation is above a predefined flicker threshold.

19. The method of claim 18, wherein said adjusting comprises performing scaling of the luminance difference calculation by a correction factor when said luminance difference is above said predefined flicker threshold, and summing a resultant scaled correction value and an original luminance value of a current pixel of said adjacent pixels, said sum of said scaled correction value and said original luminance value comprising said output luminance for said pixel.

20. The method of claim 15, wherein said reducing comprises monitoring luminance data of said decoded stream of digital motion video data and applying a correction factor thereto upon detection of said flicker between said adjacent pixels of said display of the frame.

21. The method of claim 15, wherein said reducing comprises performing multi-lined averaging of lines of said frame to be displayed whenever contrast between adjacent pixels of said multiple line exceeds a predefined flicker threshold.

22. The method of claim 15, wherein said scaling comprises scaling said decoded stream of digital motion video data to provide a downsized decoded stream of digital motion video data comprising at least one of one-quarter or one-half size.

23. A method for processing a decoded stream of digital motion video data for display, said method comprising:
   employing upsampling logic to selectively upsample said decoded stream of digital motion video data to place said decoded stream of digital motion video data in an upsampled format;
   employing anti-flicker logic to reduce flicker between adjacent pixels of a display of a frame of said decoded stream of digital motion video data, wherein said flicker comprises visually perceptible frequency change between adjacent pixels of said display of said frame in interlaced format; and
   wherein said anti-flicker logic employs in part said upsampling logic in reducing said flicker.

24. The method of claim 23, wherein said upsampling comprises performing luminance vertical upsampling, and wherein said reducing comprises monitoring luminance contrast between adjacent pixels along a vertical axis of said display.

25. The method of claim 23, wherein said reducing comprises interpolating a pixel value between said adjacent pixels of said display when contrast between said adjacent pixels is greater than a predefined flicker threshold.

26. The method of claim 25, wherein said interpolating comprises performing a luminance difference calculation on adjacent pixels of adjacent lines of said frame being displayed, and adjusting an output luminance to said display if the luminance difference calculation is above said predefined flicker threshold.

27. The method of claim 26, wherein said adjusting comprises performing scaling of the luminance difference calculation by a correction factor when said luminance difference is above said predefined flicker threshold, and adding a resultant scaled luminance difference value back to an original luminance value for a current pixel of said adjacent pixels, said sum of said scaled luminance difference value and said original luminance value comprising said output luminance for said current pixel.

28. An article of manufacture comprising:
   a computer program product comprising computer usable medium having computer readable program code means therein for use in processing an encoded stream of digital motion video data for display, said computer readable program code means in said computer program product comprising:
   decoding the encoded stream of digital motion video data to produce a decoded stream of digital motion video data;
   computer readable program code means for causing a computer to effect scaling the decoded stream of digital motion video data to downsize said decoded stream of digital motion video data and provide a downsized decoded stream of digital motion video data for display;
   computer readable program code means for causing a computer to effect employing upsampling logic for selectively placing the decoded stream of digital motion data in an upsampled format; and computer readable program code means for causing a computer to effect employing anti-flicker logic to reduce flicker between adjacent pixels of a display of a frame of said downsized decoded stream of digital motion video data, said flicker comprising visually perceptible frequency change between adjacent pixels resulting from said scaling of said decoded stream of digital motion video data for display, wherein said anti-flicker logic employs in part said upsampling logic in reducing said flicker.

29. An article of manufacture comprising:

a computer program product comprising a computer usable medium having computer readable program code means therein for use in processing a decoded stream of digital motion video data for display, said computer readable program code means in said computer program product comprising:

computer readable program code means for causing a computer to effect upsampling of the decoded stream of digital motion video data to selectively place said decoded stream of digital motion video data in an upsampled format, said upsampling employing upsampling logic; and computer readable program code means for causing a computer to effect reducing flicker between adjacent pixels of a display of a frame of said decoded stream of digital motion video data, wherein said flicker comprises visually perceptible frequency change between said adjacent pixels of said display of said frame in interlaced format, said reducing flicker employing anti-flicker logic, wherein the anti-flicker logic employs in part the upsampling logic in reducing said flicker.

* * * * *